United States Patent
Chen

(10) Patent No.: US 11,861,022 B2
(45) Date of Patent: Jan. 2, 2024

(54) METHOD AND COMPUTER PROGRAM PRODUCT AND APPARATUS FOR ENCRYPTING AND DECRYPTING PHYSICAL-ADDRESS INFORMATION

(71) Applicant: Silicon Motion, Inc., Zhubei (TW)

(72) Inventor: Yu-Ta Chen, Taipei (TW)

(73) Assignee: Silicon Motion, Inc., Zhubei (TW)

( * ) Notice: Subject to any disclaimer, the term of this patent is extended or adjusted under 35 U.S.C. 154(b) by 386 days.

(21) Appl. No.: 17/225,430

(22) Filed: Apr. 8, 2021

(65) Prior Publication Data
US 2021/0365569 A1 Nov. 25, 2021

Related U.S. Application Data

(60) Provisional application No. 63/027,429, filed on May 20, 2020.

(30) Foreign Application Priority Data

Jul. 1, 2020 (CN) .......................... 202010628724.6

(51) Int. Cl.
*G06F 21/60* (2013.01)
*G06F 3/06* (2006.01)
*G06F 12/10* (2016.01)

(52) U.S. Cl.
CPC .......... *G06F 21/602* (2013.01); *G06F 3/0604* (2013.01); *G06F 3/0659* (2013.01);
(Continued)

(58) Field of Classification Search
CPC .... G06F 21/602; G06F 3/0604; G06F 3/0659; G06F 3/0679; G06F 12/10;
(Continued)

(56) References Cited

U.S. PATENT DOCUMENTS 6,223,290 B1 * 4/2001 Larsen ................ H04W 12/126
455/410
2004/0202024 A1 * 10/2004 Shinagawa .......... G11C 16/107
365/185.29
(Continued)

FOREIGN PATENT DOCUMENTS

| CN | 109408403 A | 3/2019 |
| TW | 201833812 A | 9/2018 |

OTHER PUBLICATIONS

English translation of Taiwanese Search Report for Taiwanese Application No. 109122196, dated Apr. 30, 2021.

*Primary Examiner* — Abu S Sholeman
(74) *Attorney, Agent, or Firm* — Birch, Stewart, Kolasch & Birch, LLP

(57) ABSTRACT

The invention relates to a method, a non-transitory computer program product, and an apparatus for encrypting and decrypting physical-address information. The method includes: receiving a first read command requesting of the flash controller for first physical block addresses (PBAs) corresponding to a logical block address (LBA) range from a host side, wherein each first PBA indicates which physical address that user data of a first LBA of the LBA range is physically stored in a flash device; reading the first PBAs corresponding to the LBA range from the flash device; arranging the first PBAs into entries; encrypting content of each entry by using an encryption algorithm with an encryption parameter to obtain an encrypted entry; and delivering the encrypted entries to the host side.

18 Claims, 12 Drawing Sheets

(52) U.S. Cl.
CPC ............ *G06F 3/0679* (2013.01); *G06F 12/10* (2013.01); *G06F 2212/7201* (2013.01)

(58) Field of Classification Search
CPC ........... G06F 2212/7201; G06F 3/0623; G06F 3/064; G06F 2221/2107; G06F 12/1408; G06F 21/62; G06F 12/0246; G06F 2212/1016; G06F 2212/1052; G06F 2212/7208
See application file for complete search history.

(56) References Cited

U.S. PATENT DOCUMENTS

| | | | | |
|---|---|---|---|---|
| 2007/0074093 A1* | 3/2007 | Lasser | ................. | G06F 11/1068 |
| | | | | 714/763 |
| 2008/0046641 A1* | 2/2008 | Lasser | ................... | G11C 16/06 |
| | | | | 711/E12.002 |
| 2009/0182919 A1* | 7/2009 | Chang | ................. | G06F 13/4291 |
| | | | | 710/106 |
| 2012/0260349 A1* | 10/2012 | Nagai | ............. | G11B 20/00673 |
| | | | | 726/28 |
| 2018/0260151 A1 | 9/2018 | Hsu | | |
| 2018/0329816 A1 | 11/2018 | Hsu | | |
| 2019/0146908 A1* | 5/2019 | Huang | ................. | G06F 3/0659 |
| | | | | 711/103 |

* cited by examiner

METHOD AND COMPUTER PROGRAM PRODUCT AND APPARATUS FOR ENCRYPTING AND DECRYPTING PHYSICAL-ADDRESS INFORMATION

CROSS-REFERENCE TO RELATED APPLICATIONS

This application claims the benefit of priority to U.S. Provisional Application Ser. No. 63/027,429, filed on May 20, 2020; and Patent Application No. 202010628724.6, filed in China on Jul. 1, 2020; the entirety of which is incorporated herein by reference for all purposes.

BACKGROUND

The disclosure generally relates to storage devices and, more particularly, to a method, an apparatus, and a computer program product for encrypting and decrypting physical-address information.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

To improve the performance for reading and programming data from and into a flash module, the flash controller utilizes multiples channels to perform the data reads and writes in parallel. In order to gain advantage of parallel processing, continuous data is distributed to be stored in flash units connected to the channels and logical-to-physical mapping (L2P) tables are used to record mapping relationships between logical addresses (managed by a host side) and physical addresses (managed by the flash controller) for user-data segments. Furthermore, in the new specification, the flash controller can organize the mapping relationships between the logical addresses and the physical addresses into the format of host performance booster (HPB) entries and provide them to the host side. After that, the host side may obtain the required physical addresses from the HPB entries and carry the physical addresses in the HPB read command sent to the host side, so that the flash controller can directly read user data from the physical addresses of the flash module and reply it to the host side, without spending time and computing resources to read the L2P tables and perform the L2P translation as before. However, the HPB entries are provided in plain code typically. The illegal persons may spy on the physical addresses of the HPB entries with the host side to know the internal management performed in the device side and steal data (e.g. the system data or the management data) stored in the device side in an abnormal way. Thus, it is desirable to have a method, a computer program product, and an apparatus for encrypting and decrypting physical-address information to improve the data security.

SUMMARY

In an aspect of the invention, an embodiment introduces a method for encrypting and decrypting physical-address information, performed by a flash controller, including: receiving a first read command requesting of the flash controller for a plurality of first physical block addresses (PBAs) corresponding to a logical block address (LBA) range from a host side, wherein each first PBA indicates which physical address that user data of a first LBA of the LBA range is physically stored in a flash device; reading the first PBAs corresponding to the first LBAs of the LBA range from the flash device; arranging the first PBAs into a plurality of entries; encrypting content of each entry by using an encryption algorithm with an encryption parameter to obtain an encrypted entry; and delivering the encrypted entries to the host side, thereby enabling the host side to issue a second read command carrying the encrypted entry to the flash controller to request the flash controller for reading user data from a second PBA enclosed in the encrypted entry.

In another aspect of the invention, an embodiment introduces a non-transitory computer program product for encrypting and decrypting physical-address information when executed by a processing unit of a flash controller. The non-transitory computer program product including program code to complete the operations recited the aforementioned method.

In still another aspect of the invention, an embodiment introduces an apparatus for encrypting and decrypting physical-address information to include: a control logic, coupled to a flash device; a host interface (I/F), coupled to a host side; and a processing unit, coupled to the control logic and the host I/F. The processing unit is arranged operably to receive a first read command requesting of the apparatus for a plurality of first PBAs corresponding to an LBA range from the host side through the host I/F, wherein each first PBA indicates which physical address that user data of a first LBA of the LBA range is physically stored in a flash device; read a T1 table from the flash device through the control logic, which comprises the first PBAs corresponding to the LBA range; arrange the first PBAs into a plurality of entries; encrypt content of each entry by using an encryption algorithm with an encryption parameter to obtain an encrypted entry; and deliver the encrypted entries to the host side through the host I/F, thereby enabling the host side to issue a second read command carrying the encrypted entry to the flash controller to request the flash controller for reading user data from a second PBA enclosed in the encrypted entry.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
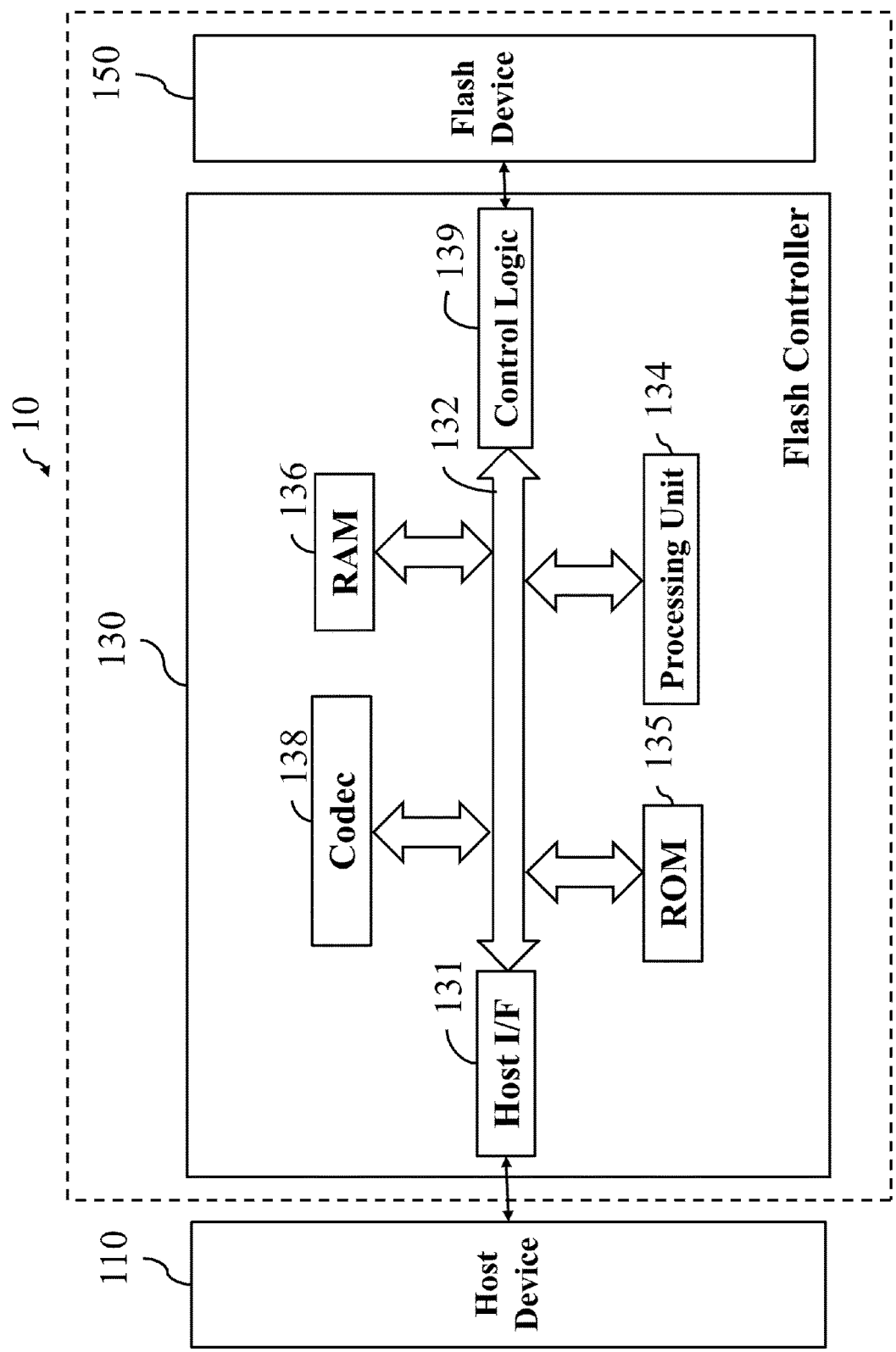
FIGS. 1 and 2 are the system architectures of electronic apparatuses according to embodiments of the invention.

Refer to FIG. 1. The electronic apparatus 10 includes the host device (also referred to as a host side) 110, the flash controller 130 and the flash device 150, and the flash controller 130 and the flash device 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and the host interface (I/F) 131 of the flash controller 130 may communicate with each other by Universal Flash Storage (UFS). Although the following embodiments describe the functionalities of Host Performance Booster (HPB) defined in the UFS specification, those artisans may apply the invention in similar functionalities defined in other specifications, and the invention should not be limited thereto. The control logic 139 of the flash controller 130 and the flash device 150 may communicate with each other by a Double Data Rate (DDR) protocol, such as Open NAND Flash Interface (ONFI), DDR Toggle, or others. The flash controller 130 includes a processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 receives HPB commands, such as HPB READ, HPB READ BUFFER, HPB WRITE BUFFER commands, through the host I/F 131, schedules and executes these commands. The flash controller 130 includes the Random Access Memory (RAM) 136 and the RAM 136 may be implemented in a Dynamic Random Access Memory (DRAM), a Static Random Access Memory (SRAM), or the combination thereof, for allocating space as a data buffer. The RAM 136 stores necessary data in execution, such as variables, data tables, data abstracts, and so on. The flash controller 130 includes the Read Only Memory (ROM) for storing program code that is required to be executed in the system booting. The control logic 139 includes a NAND flash controller (NFC) to provide functions that are required to access to the flash device 150, such as a command sequencer, a Low Density Parity Check (LDPC) encoder/decoder, etc.

The flash controller 130 includes the coder-decoder (Codec) 138 being dedicated hardware. The Codec 138 includes an encoding logic for encrypting raw HPB entries; and a decoding logic for decrypting the encrypted content to recover the raw HPB entries. The following paragraphs will describe the details of the structures, the functionalities, and the interactions with other components for the Codec 138.

The bus architecture 132 may be configured in the flash controller 130 for coupling between components to transfer data, addresses, control signals, etc., which include the host I/F 131, the processing unit 134, the ROM 135, the RAM 136, the Codec 138, the control logic 139, and so on. In some embodiments, the host I/F 131, the processing unit 134, the ROM 135, the RAM 136, the Codec 138, the control logic 139 are coupled to each other by a single bus. In alternative embodiments, a high-speed bus is configured in the flash controller 130 for coupling the processing unit 134, the Codec 138 and the RAM 136 to each other and a low-speed bus is configured for coupling the processing unit 134, the Codec 138, the host I/F 131 and the control logic 139 to each other. The bus includes a set of parallel physical-wires connected to two or more components of the flash controller 130.

The flash device 150 provides huge storage space typically in hundred Gigabytes (GB), or even several Terabytes (TB), for storing a wide range of user data, such as high-resolution images, audio files, video files, etc. The flash device 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash device 150 and reads user data from a designated address (a source address) thereof through the control logic 139. The control logic 139 may use several electronic signals run on physical wires including data lines, a clock signal line and control signal lines for coordinating the command, address and data transfer with the flash device 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
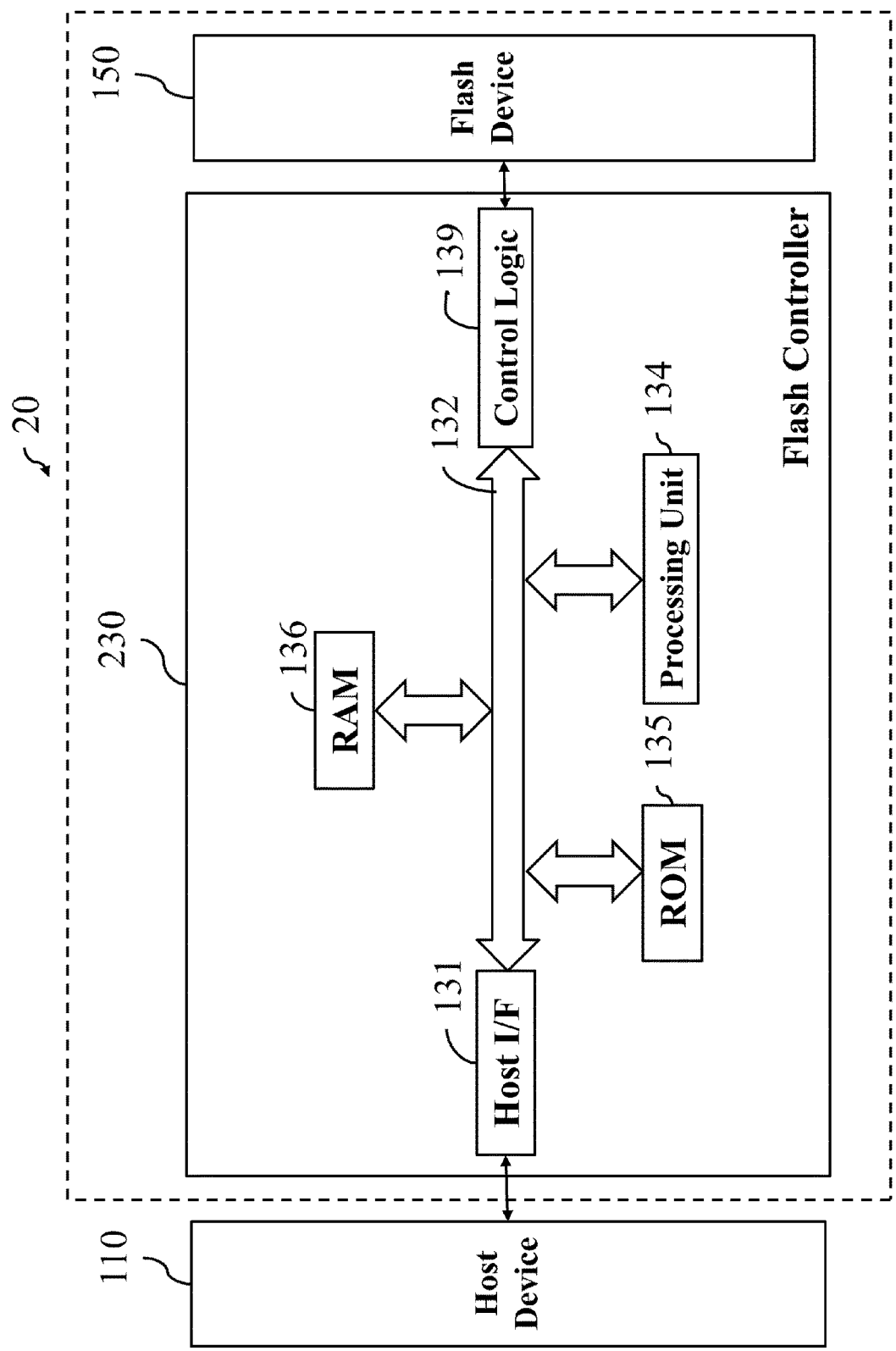

In alternative embodiments, refer to FIG. 2. The electronic apparatus 20 includes the modified flash controller 230, which does not include the Codec 138 as shown in FIG. 1. In the flash controller 230, the functions of the Codec 138 may be replaced by software or firmware instructions, and the processing unit 134 when loading and executing these instructions encrypts raw HPB entries and decrypts the encrypted content to recover the raw HPB entries. In other words, FIG. 1 encloses the hardware solutions while FIG. 2 encloses software solutions for the encryption and the decryption.

Figure 3:
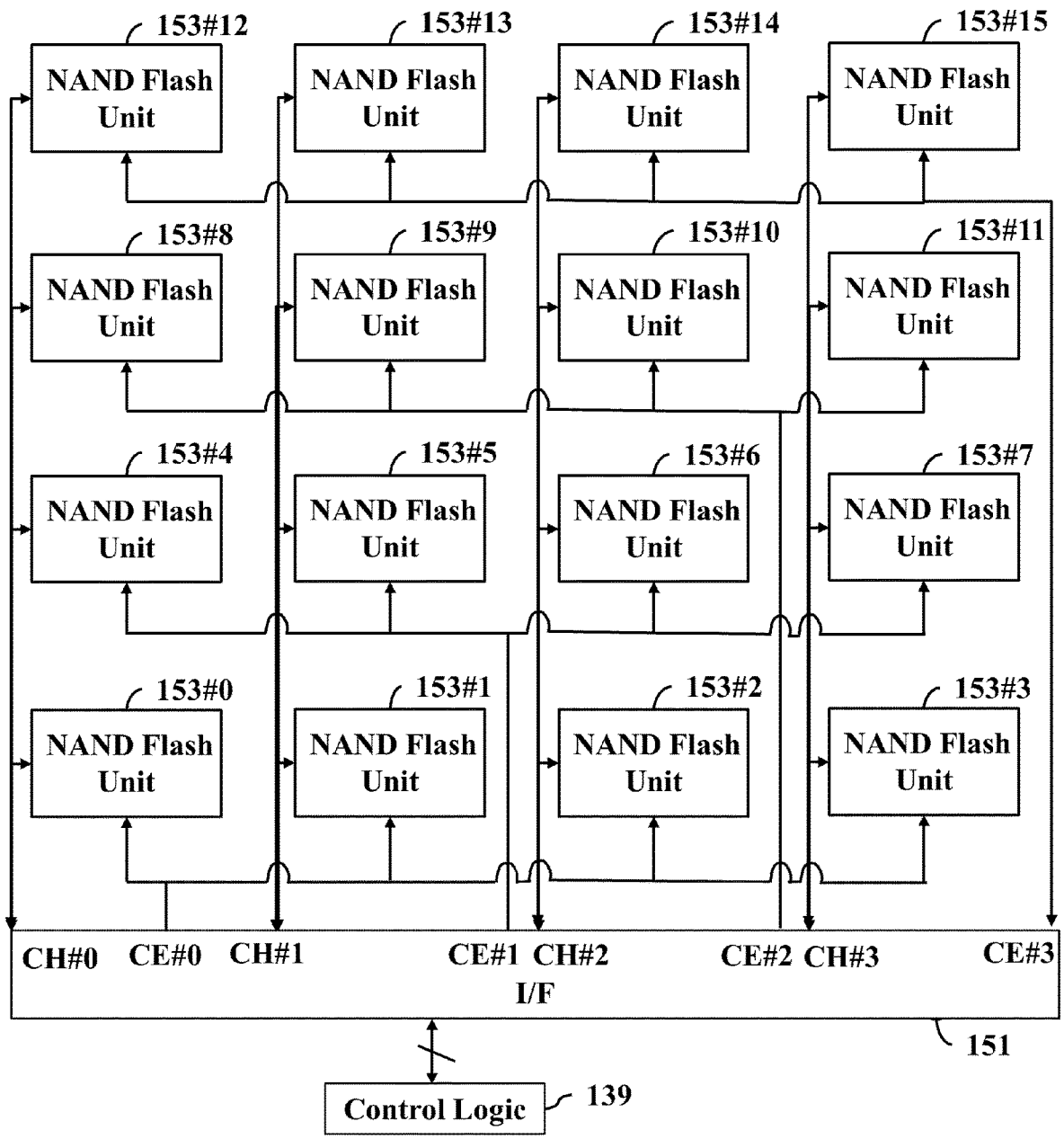
FIG. 3 is a schematic diagram illustrating a flash device according to an embodiment of the invention.

Refer to FIG. 3. The I/F 151 of the flash device 150 may include four I/O channels (hereinafter referred to as channels) CH #0 to CH #3 and each is connected to four NAND flash units, for example, the channel CH #0 is connected to the NAND flash units 153#0, 153#4, 153#8 and 153#12. Each NAND flash unit can be packaged in an independent die. The control logic 139 may issue one of the CE signals CE #0 to CE #3 through the I/F 151 to activate the NAND flash units 153#0 to 153#3, the NAND flash units 153#4 to 153#7, the NAND flash units 153#8 to 153#11, or the NAND flash units 153#12 to 153#15, and read data from or program data into the activated NAND flash units in parallel.

Figure 4:
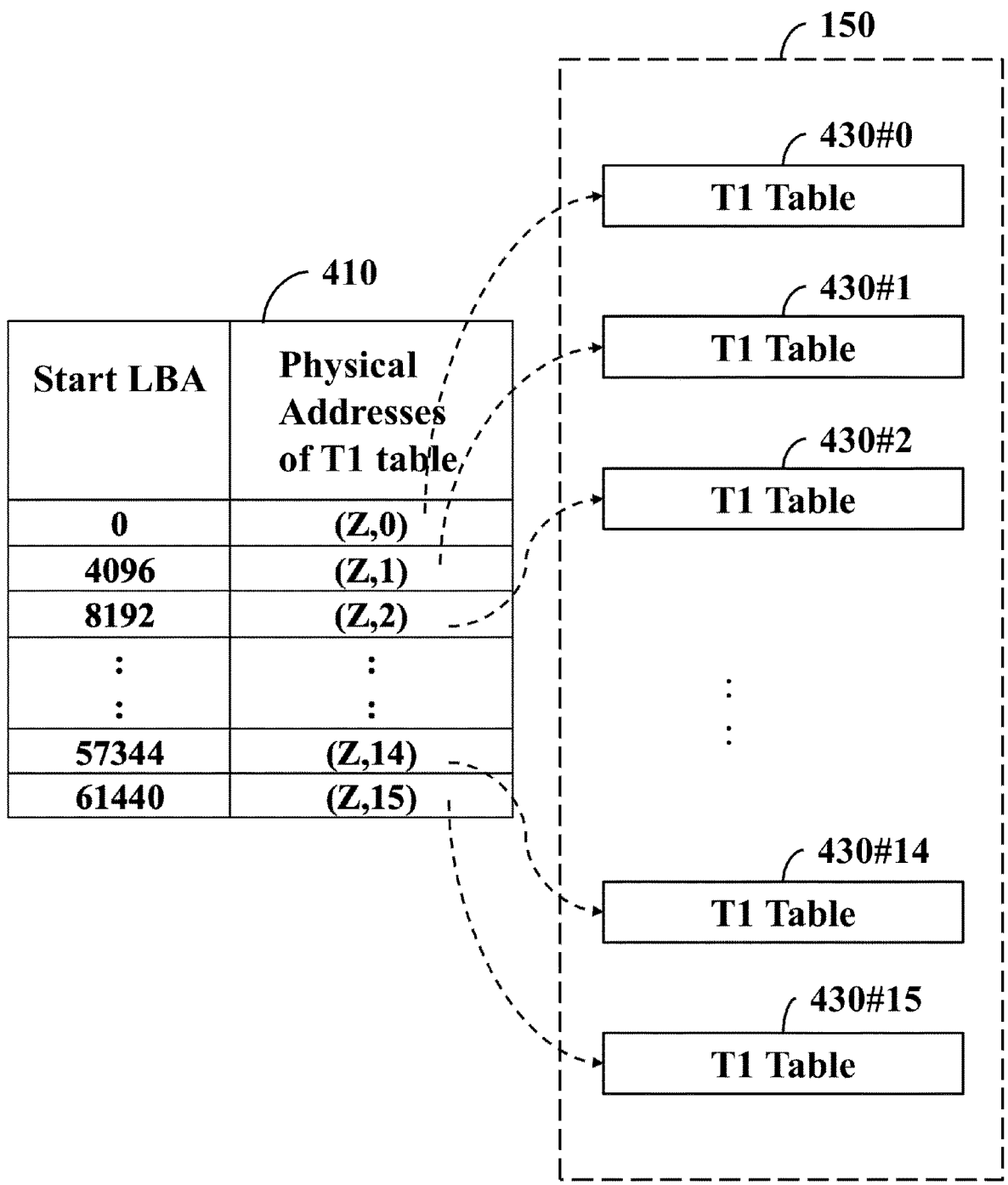
FIG. 4 is a schematic diagram illustrating the association between a T2 table and T1 tables according to an embodiment of the invention.

Since continuous data is distributed to be stored in flash units connected to multiple channels, the flash controller 130 uses a logical-to-physical (L2P) mapping table to record mapping relationships between logical addresses (managed by the host device 110) and physical addresses (managed by the flash controller 130) for user-data segments. The L2P table may be referred to as the host-to-flash (H2F) mapping table. The H2F mapping table includes multiple records arranged in the order of logical addresses and each record stores information indicating which physical address that user data of the corresponding logical address is physically stored in the flash module 150. However, because the RAM 136 cannot provide enough space to store the whole H2F table for the processing unit 134, the whole H2F table is divided into multiple Tables 1 (also referred to as T1 tables) and the T1 tables are stored in the non-volatile flash device 150, so that only necessary T1 table or tables are read from the flash device 150 and stored in the RAM 136 for fast look-up when data read operations are performed in the future. Refer to FIG. 4. The whole H2F table is divided into T1 tables 430#0~430/#15. The processing unit 134 further maintains a Table 2 (also referred to as a T2 table) 410, which contains multiple records arranged in the order of the logical addresses. Each record stores information indicating which physical address that the corresponding T1 table for a designated logical address range is physically stored in. For example, the T1 table 430#0 associated with the $0^{th}$ to the $4095^{th}$ logical block addresses (LBAs) is stored in the $0^{th}$ physical page of a designated physical block of a designated LUN (the letter "Z" represents the number of the designated physical block and the designated LUN), the T1 table 430#1 associated with the $4096^{th}$ to the $8191^{th}$ LBAs is stored in the $1^{st}$ physical page of the designated physical block of the designated LUN, and the remaining can be deduced by analogy. Although FIG. 4 shows 16 T1 tables only, those artisans may modify the design to put more T1 tables depending on the capacity of the flash device 150, and the invention should not be limited thereto.

Figure 5:
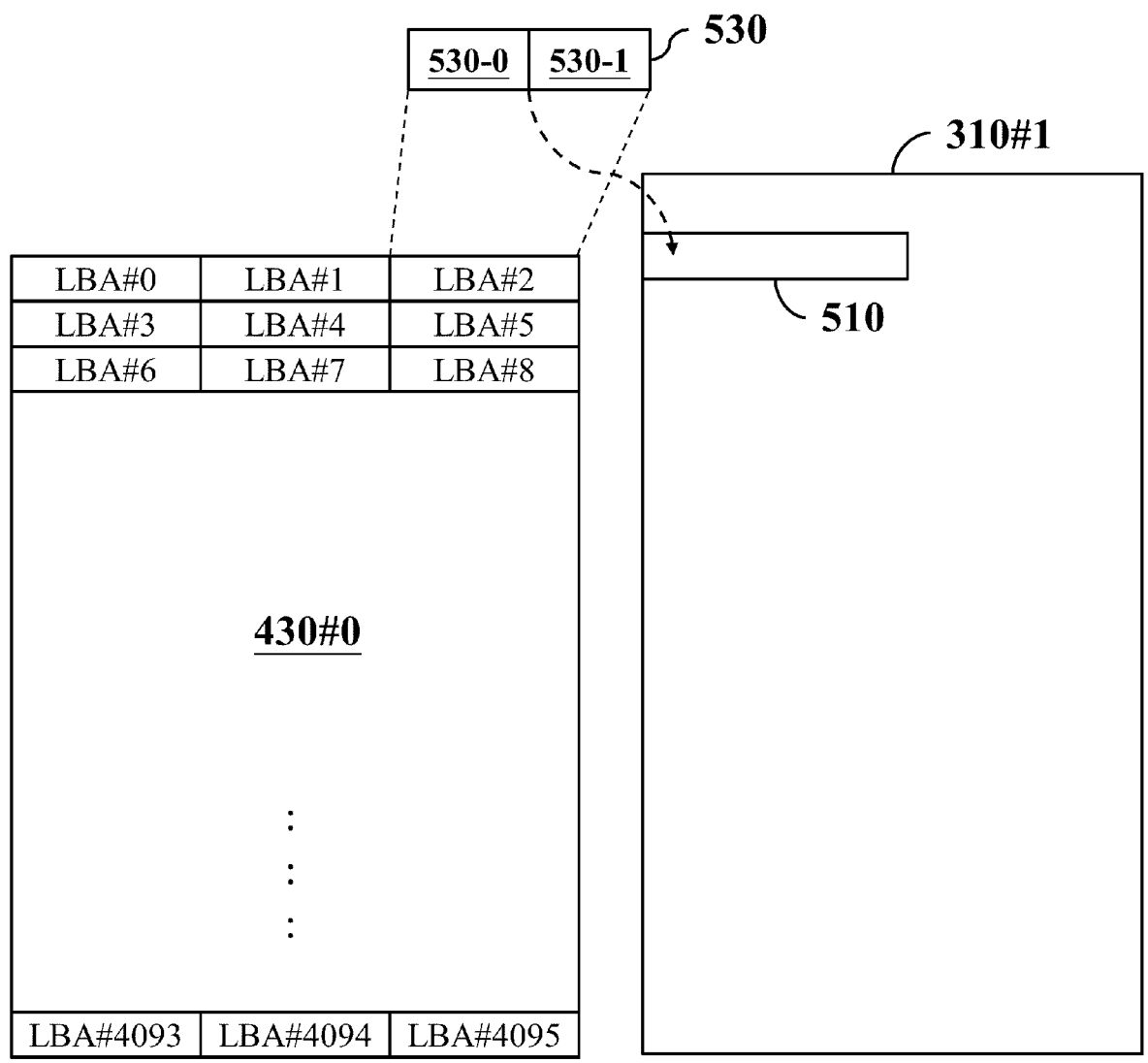
FIG. 5 is a schematic diagram illustrating a mapping of a T1 table to space of a physical page according to an embodiment of the invention.

Space required by each T1 table may be 4 KB, 8 KB, 16 KB, or others. Each T1 table stores physical-address information corresponding to LBAs in the order of LBA, and each LBA corresponds to a fixed-length physical storage space, such as 4 KB. Refer to FIG. 5. For example, the T1 table 430#0 stores physical-address information from LBA #0 to LBA #4095 sequentially. The physical-address information may be represented in four bytes: the two least-significant bytes 530-0 records a physical block number and the two most-significant bytes 530-1 records a physical page number. For example, the physical-address information 530 corresponding to LBA #2 points to the physical page 510 of the physical block 310#1. The bytes 530-0 records the number of the physical block 310#1 and the bytes 530-1 records the number of the physical page 510.

Figure 6:
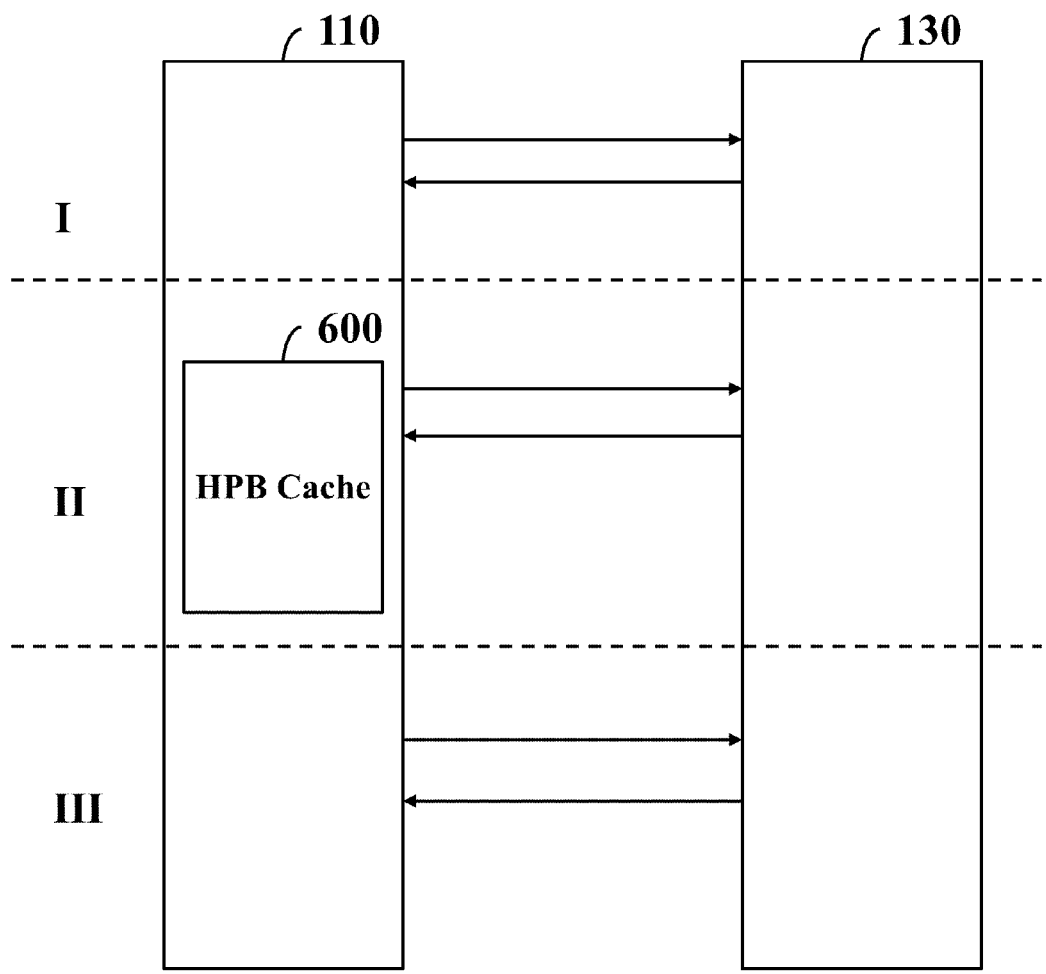
FIG. 6 is a schematic diagram for establishing and using a Host Performance Booster (HPB) cache according to an embodiment of the invention.

Refer to FIG. 6. In the HPB specification, the host side 110 allocates space of its system memory as an HPB cache 600 for temporarily storing information of the H2F mapping table maintained by the device side. The HPB cache 600 stores multiple HPB entries received from the device side and each HPB entry records physical-address information corresponding to one LBA. Subsequently, the host side can issue read commands with the HPB entries to read user data of the corresponding LBAs. The device side can directly drive the control logic 139 to read user data of the designated LBAs according to the information of HPB entries, without spending time and computing resources to read the H2P mapping table from the flash device 150 and perform the L2P translation as before. The establishment and use of HPB cache 600 may be diviced into three stages:

Stage I (HPB initiation): The host side 110 requests the device side (specifically, the flash controller 130) for retrieving device capabilities and configuring the HPB feature in the device side, including the HPB mode, and so on.

Stage II (L2P cache management): The host side 110 allocates space of its system memory as the HPB cache 600 for storing the HPB entries. The host side 110 issues an HPB READ BUFFER command based on the configured HPB mode to the flash controller 130 to load the designated HPB entries from the device side at needed time points. Subsequently, the host side 110 stores the HPB entries in one or more Sub-Regions of the HPB cache 600. In the HPB specification, the LBAs of each logic unit (for example, partition) are divided into multiple HPB Regions, and each HPB Region is further subdivided into multiple Sub-Regions. For example, the HPB cache 600 may include "N" HPB Regions, and each HPB Region may include "L" Sub-Regions for storing the HPB entries for an LBA range, where "N" and "L" are variables being positive integers. The partition range of HPB cache 600 is shown in Table 1:

TABLE 1

| | |
|---|---|
| HPB Sub-Region #0 | HPB Region #0 |
| HPB Sub-Region #1 | |
| ... | |
| HPB Sub-Region #L-1 | |
| ... | ... |
| ... | |
| ... | |
| ... | |
| HPB Sub-Region #0 | HPB Region #N-1 |
| HPB Sub-Region #1 | |
| ... | |
| HPB Sub-Region #L-1 | |

In some embodiments, each Region and each Sub-Region may be set to have space of 32 MB individually, that is, each Region contains only one Sub-Region. In alternative embodiments, each Region may be set to have space of 32 MB, and each Sub-Region may be set to have space of 4 MB, 8 MB or 16 MB, that is, each Region contains eight, four, or two Sub-Regions.

Stage III (HPB read command): The host side 110 searches the HPB entries of the HPB cache 600 to obtain physical block addresses (PBAs) corresponding to the user data of LBAs that are attempted to read. Then, the host side 110 issues an HPB READ command which includes the HPB entries in addition to the LBA, the TRANSFER LENGTH, etc. to the flash controller 130 to obtain the designated user data from the device side.

However, the PBA information of the HPB entries are provided in plain code typically. The illegal persons may spy on the HPB information with the host side 110 to know the internal management performed in the device side and steal data (e.g. the system or management data) stored in the device side in an abnormal way.

The HPB specification defines two modes for obtaining the HPB entries: the host control mode; and the device control mode. The host control mode is triggered by the host side 110 to determine which HPB Sub-Regions need to be stored in the HPB cache 600 while the device control mode is triggered by the flash controller to determine which HPB Sub-Regions need to be stored in the HPB cache 600. Those artisans realize that the embodiments of the invention can be applied in the two modes, or the similar.

Figure 7:
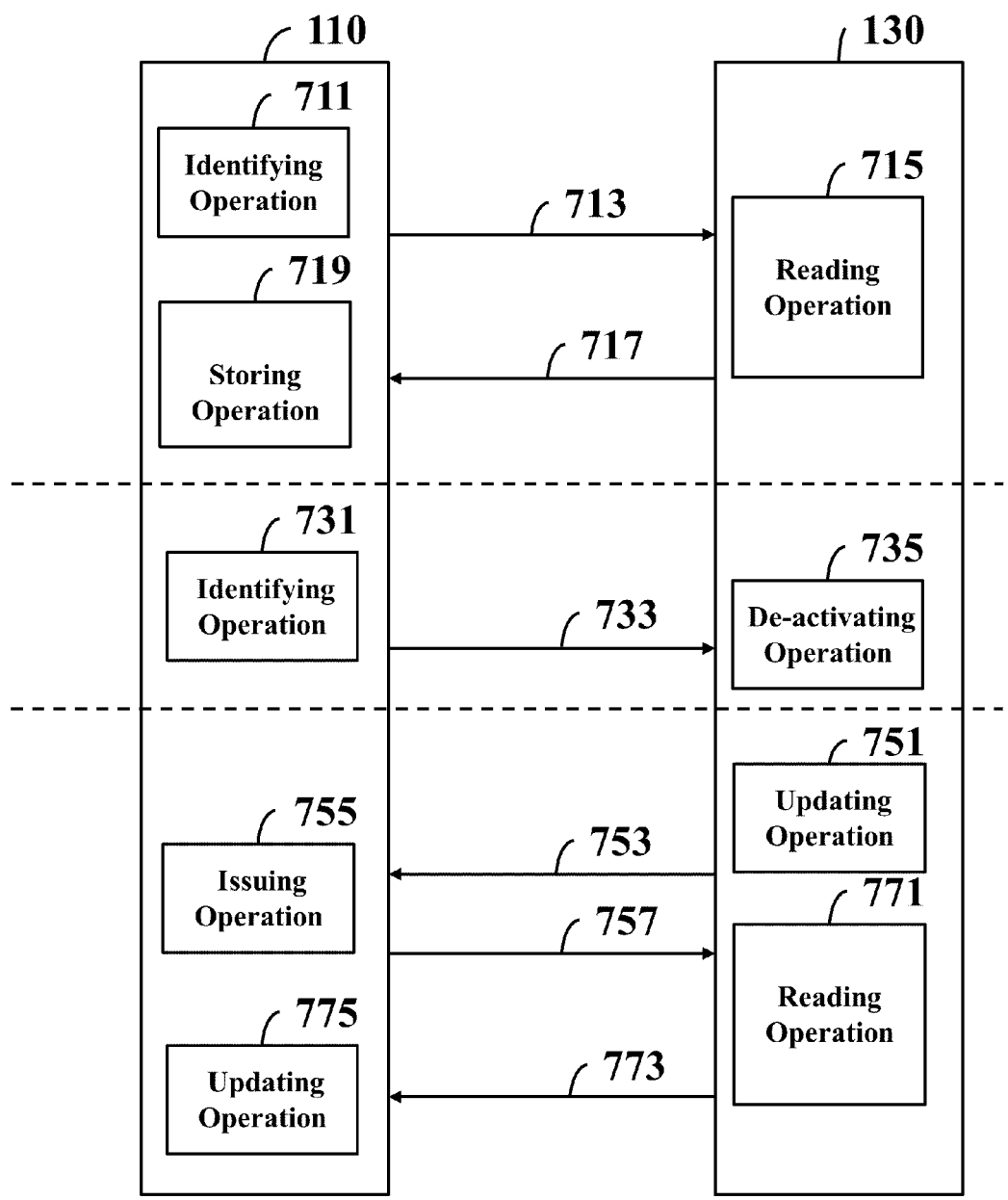
FIG. 7 is a schematic diagram showing an operation sequence applied in the host control mode according to an embodiment of the invention.

Refer to FIG. 7 showing the diagram of the operation sequence applied in the host control mode. The detailed description is as follows:

Operation 711: The host side 110 identifies which Sub-Regions are to be activated.

Operation 713: The host side 110 issues an HPB READ BUFFER command to the flash controller 130 to request the flash controller 130 for the HPB entries of the identified Sub-Region. The HPB READ BUFFER command may contain 10 bytes, in which the $0^{th}$ byte records the operation code "F9h", the $2^{nd}$ and the $3^{rd}$ bytes record information regarding the HPB Region to be activated, and the $4^{th}$ and the $5^{th}$ bytes record information regarding the Sub-Region to be activated.

Operation 715: The flash controller 130 reads the designated portion of the H2F mapping table from the flash device 150, and arranges the read mapping information into HPB entries. In order to prevent the PBA information in the HPB entries from being snooped by illegal persons to know the internal management of data storage, the flash controller 130 encrypts the content of HPB entries. The following paragraphs will explain the reading operation in more detail.

Operation 717: The flash controller 130 delivers a DATA IN UFS Protocol Information Unit (UPIU) to the host side 110, which includes the encrypted content of the HPB entries of the identified Sub-Regions, rather than plain code.

Operation 719: The host side 110 receives and stores the encrypted HPB entries in the activated Sub-Regions of the HPB cache 600.

Operation 731: The host side 110 identifies which Regions to be deactivated. It is to be noted herein that in the HPB specification, the basic unit for activation is Sub-Region while the basic unit for de-activation is Region. The host side 110 may determine the activated Sub-Regions and the de-activated Region according to the requirements of its algorithm.

Operation 733: The host side 110 issues an HPB WRITE BUFFER command to the flash controller 130 to request the flash controller 130 for de-activating the identified Region. The HPB WRITE BUFFER command may contain 10 bytes, in which the $0^{th}$ byte records the operation code "FAh", and the $2^{nd}$ and the $3^{rd}$ bytes record information regarding the HPB Region to be de-activated.

Operation 735: The flash controller 130 de-activates the HPB Region. For example, after delivering the HPB entries to the host side 110, the flash controller 130 may perform an optimized operation on the read process of the subsequent read commands issued by the host side 110 for the activated Sub-Regions. Then, after receiving the notification of the de-activation of the Region including the previously activated Sub-Regions, the flash controller 130 may stop the optimized operation corresponding to the de-activated Region.

Operation 751: After executing one or more host write commands, or host erase commands, or performing a background operation (such as a garbage collection, a wear leveling, a read reclaim, or a read reflash process) completely, the flash controller 130 may update the content of H2F mapping table, which includes the content of activated Sub-Regions.

Operation 753: The flash controller 130 sends a RESPONSE UPIU to the host side 110, which suggests updating the HPB entries of the modified Sub-Regions to the host side 110.

Operations 755 and 757: The host side 110 issues an HPB READ BUFFER command to the flash controller 130 to request the flash controller 130 for the updated HPB entries of the recommended Sub-Regions.

Operation 771: The flash controller 130 reads the designated portion of the H2F mapping table from the flash device 150, and arranges the read mapping information into HPB entries. Similarly, the flash controller 130 encrypts the content of HPB entries. The following paragraphs will explain the reading operation in more detail.

Operation 773: The flash controller 110 delivers a DATA IN UPIU to the host side 110, which includes the encrypted content of the HPB entries of the updated Sub-Regions, rather than plain code.

Operation 775: The host side 110 overwrites the content of corresponding Sub-Region of the HPB cache 600 with the encrypted HPB entries received from the flash controller 110.

Figure 8:
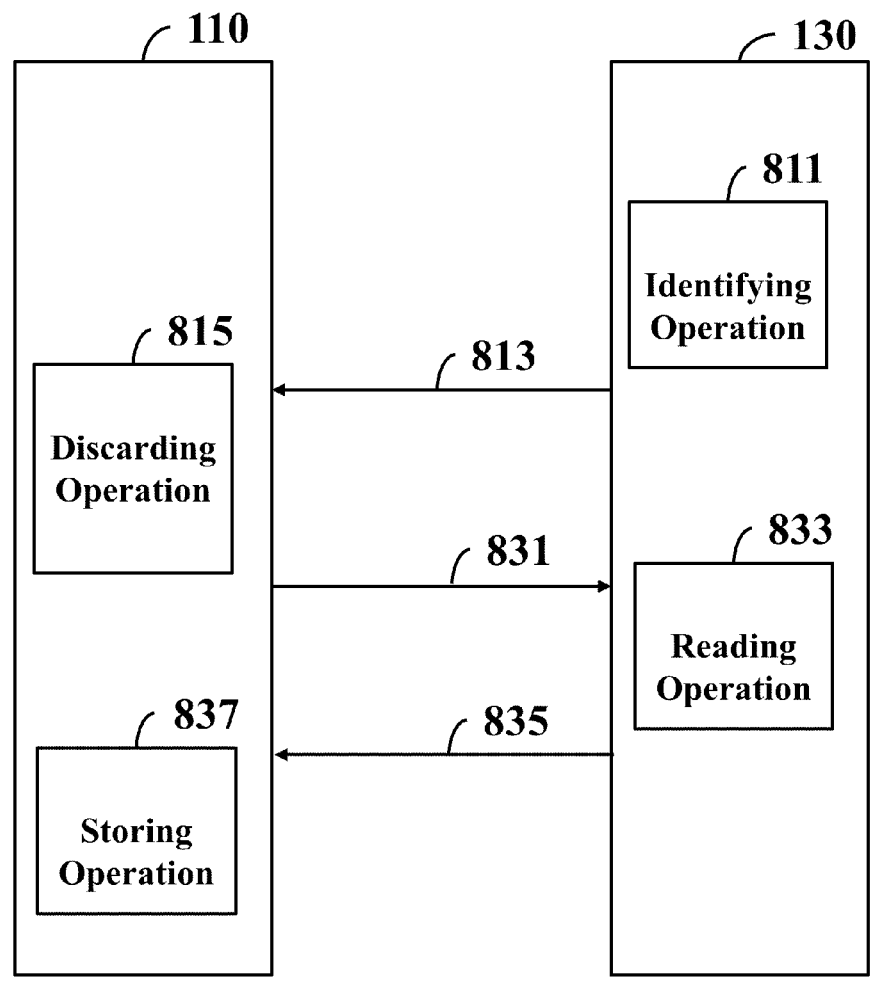
FIG. 8 is a schematic diagram showing an operation sequence applied in the device control mode according to an embodiment of the invention.

Refer to FIG. 8 showing the diagram of the operation sequence applied in the device control mode. The detailed description is as follows:

Operation 811: The flash controller 130 identifies which Sub-Regions are to be activated, and/or which Regions are to be de-activated.

Operation 813: The flash controller 130 sends a RESPONSE UPIU to the host side 110, which suggests activating the aforementioned Sub-Regions and/or de-activating the aforementioned Regions to the host side 110.

Operation 815: If required, the host side 110 discards the HPB entries of the de-activated Regions from the system memory.

Operation 831: If required, the host side 110 issues an HPB READ BUFFER command to the flash controller 130 to request the flash controller 130 for the HPB entries of the suggested Sub-Regions.

Operation 833: The flash controller 130 reads the designated portion of the H2F mapping table from the flash device 150, and arranges the read mapping information into HPB entries. Similarly, the flash controller 130 encrypts the content of HPB entries. The following paragraphs will explain the reading operation in more detail.

Operation 835: The flash controller 110 delivers a DATA IN UPIU to the host side 110, which includes the encrypted content of the HPB entries of the corresponding Sub-Regions, rather than plain code.

Operation 837: The host side 110 receives and stores the encrypted HPB entries in the activated Sub-Regions of the HPB cache 600.

Figure 9:
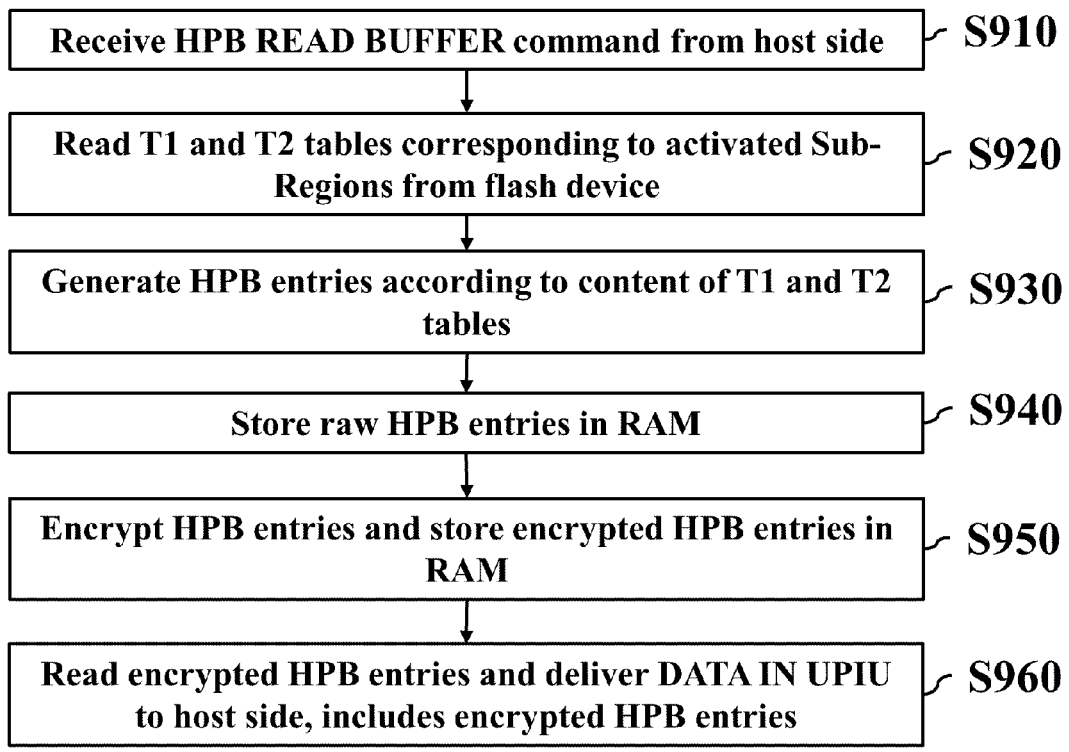
FIG. 9 is a flowchart illustrating a method for generating HPB entries according to an embodiment of the invention.

Technical details regarding the reading operations 715, 771 or 833 may refer to FIG. 9 showing a flowchart of a method for generating HPB entries. The method is performed by the processing unit 134 when loading and executing relevant software or firmware program code. Further description is as follows:

Step S910: The aforementioned HPB READ BUFFER command is received from the host side 110 through the host I/F 131, which includes information regarding Sub-Regions to be activated. The HPB READ BUFFER command is used to request the flash controller 130 for PBAs corresponding to an LBA range.

Step S920: The T1 and T2 tables corresponding to the activated Sub-Region are read from the flash device 150 through the control logic 139.

Step S930: HPB entries are generated according to the content of T1 and T2 tables. Those artisans will realize that the length (for example, 8-byte) of each HPB entry defined in the HPB specification may be longer than the length (for example, 4-byte) of the physical-address information associated with each LBA recorded in the T1 table. Thus, in some embodiments, in addition to the physical-address information associated with each LBA (that is, the PBA information for this LBA recorded in the T1 table), the processing unit 134 may fill dummy values with the remaining space of each HPB entry. In alternative embodiments, in addition to the physical-address information associated with each LBA, the processing unit 134 may fill other information with the remaining space of each HPB entry depending on different system requirements to accelerate the future HPB read operations.

In some embodiments, in each HPB entry of 8-byte, the processing unit 134 may fill in the corresponding PBA information of the T1 table in 4-byte and the corresponding PBA information of the T2 table in 4-byte. The PBA information of the T1 table indicates where data of a specific LBA is actually stored in the flash device 150. The PBA information of the T2 table will be used to inspect whether this HPB entry is invalid by the device side. If the PBA information of the T2 table included in the HPB entry obtained from a future HPB READ command does not match the address that the corresponding T1 table is actually stored in the flash device 150, then the processing unit 134 determines that this HPB entry is invalid. Exemplary HPB entries are illustrated in Table 2:

TABLE 2

| HPB Entry Number | PBA information of T2 table (4-byte) | PBA information of T1 table (4-byte) |
| --- | --- | --- |
| 0 | 0x00004030 | 0x0000A000 |
| 1 | 0x00004030 | 0x0000A001 |
| 2 | 0x00004030 | 0x0000A002 |
| 3 | 0x00004030 | 0x0000A003 |
| 4 | 0x00004030 | 0x0000A004 |
| 5 | 0x00004030 | 0x0000A005 |

TABLE 2-continued

| HPB Entry Number | PBA information of T2 table (4-byte) | PBA information of T1 table (4-byte) |
| --- | --- | --- |
| 6 | 0x00004030 | 0x0000B009 |
| 7 | 0x00004030 | 0x0000A007 |
| 8 | 0x00004030 | 0x0000A008 |
| 9 | 0x00004030 | 0x0000A009 |
| 10 | 0x00004030 | 0x0000A00A |
| 11 | 0x00004030 | 0x0000B00A |
| 12 | 0x00004030 | 0x0000A00C |
| ... | ... | ... |

In alternative embodiments, in each HPB entry of 8-byte, the processing unit 134 may fill in the corresponding PBA information of the T1 table in 28-bit, the corresponding PBA information of the T2 table in 24-bit, and a continuous length of 12-bit. The continuous length indicates how many LBAs of user data after this LBA are stored in continuous physical addresses in the flash device 150. Therefore, one HPB entry can describe information regarding multiple consecutive PBAs in the T1 table. Exemplary HPB entries are illustrated in Table 3:

TABLE 3

| HPB Entry Number | Continuous Length (12-bit) | PBA information of T2 table (24-bit) | PBA information of T1 table (28-bit) |
| --- | --- | --- | --- |
| 0 | 0x5 | 0x004030 | 0x000A000 |
| 1 | 0x4 | 0x004030 | 0x000A001 |
| 2 | 0x3 | 0x004030 | 0x000A002 |
| 3 | 0x2 | 0x004030 | 0x000A003 |
| 4 | 0x1 | 0x004030 | 0x000A004 |
| 5 | 0x0 | 0x004030 | 0x000A005 |
| 6 | 0x0 | 0x004030 | 0x000B009 |
| 7 | 0x3 | 0x004030 | 0x000A007 |
| 8 | 0x2 | 0x004030 | 0x000A008 |
| 9 | 0x1 | 0x004030 | 0x000A009 |
| 10 | 0x0 | 0x004030 | 0x000A00A |
| 11 | 0x0 | 0x004030 | 0x000B00A |
| 12 | 0x3 | 0x004030 | 0x000A00C |
| 13 | 0x2 | 0x004030 | 0x000A00D |
| 14 | 0x1 | 0x004030 | 0x000A00E |
| 15 | 0x0 | 0x004030 | 0x000A00F |
| ... | ... | ... | ... |

Suppose that the $0^{th}$ HPB entry of Table 3 is associated with LBA "0x001000": The $0^{th}$ HPB entry indicates that five LBAs of user data after LBA "0x001000" are stored in continuous physical addresses in the flash device 150. Specifically, the user data of LBAs "0x001000" to "0x001005" are stored in PBA "0x00A000" to "0x00A005" in the flash device 150, respectively. The processing unit 134 will read user data of six LBAs "0x001000" to "0x001005" according to the information carried in the $0^{th}$ HPB entry. If an HPB READ command indicates that user data of LBA "0x001000" is attempted to read, and the TRANSFER LENGTH is equal to or shorter than "6", then the processing unit 134 will not need to read the corresponding portion of the H2F mapping table from the flash device 150.

In alternative embodiments, in each HPB entry of 8-byte, the processing unit 134 may fill in the corresponding PBA information of the T1 table in 28-bit, the corresponding PBA information of the T2 table in 24-bit, and a continuous bit table of 12-bit. The continuous bit table is used to describe the PBA continuity of multiple LBAs after this LBA (such as, 12 consecutive LBAs). For example, the 12 bits corresponds to 12 consecutive LBAs, respectively. Exemplary HPB entries are illustrated in Table 4:

TABLE 4

| HPB Entry Number | Continuous Bit Table (12-bit) | PBA information of T2 table (24-bit) | PBA information of T1 table (28-bit) |
| --- | --- | --- | --- |
| 0 | 0xBDF (101111011111) | 0x004030 | 0x000A000 |
| 1 | 0xDEF (110111101111) | 0x004030 | 0x000A001 |
| 2 | 0xEF7 (111011110111) | 0x004030 | 0x000A002 |
| 3 | 0xF7B (111101111011) | 0x004030 | 0x000A003 |
| 4 | ... | 0x004030 | 0x000A004 |
| ... | ... | ... | ... |

Suppose that the $0^{th}$ HPB entry of Table 4 is associated with LBA "0x001000": The continuous bit table of the $0^{th}$ HPB entry indicates the PBA continuity of LBAs "0x001001" to "0x00100C". Ideally, the user data of LBAs "0x001001" to "0x00100C" are stored in the PBA "0x000A001" to "0x000A00C" in the flash device 150, respectively. The value of each bit being "0" means that the user data of the corresponding LBA is not stored in the ideal PBA while the value of each bit being "1" means that the user data of the corresponding LBA is stored in the ideal PBA. Thus, in light of the $0^{th}$ HPB entry, the processing unit 134 can predict the PBAs for that the continuous bits are "1" and read the user data from the predicted PBAs of the flash device 150, but ignores the PBAs for that the continuous bits are "0". For example, the host device 110 issues the HPB READ command including the parameters carrying the $0^{th}$ HPB entry and the TRANSFER LENGTH being "9" to request the flash controller 130 for the user data of LBAs "0x001000" to "0x001008". The processing unit 134 obtains the continuous bit table from the $0^{th}$ HPB entry in the HPB READ command, and predicts the PBAs that the user data of LBAs "0x001000" to "0x001005" and LBAs "0x001007" to "0x001008" are physically stored in after decoding the continuous bit table, without loading the H2F mapping table from the flash device 150. In cases where there are only a few breakpoints, the number of times of loading specific PBA information of the T1 table from the flash device 150 would be reduced.

Figure 10:
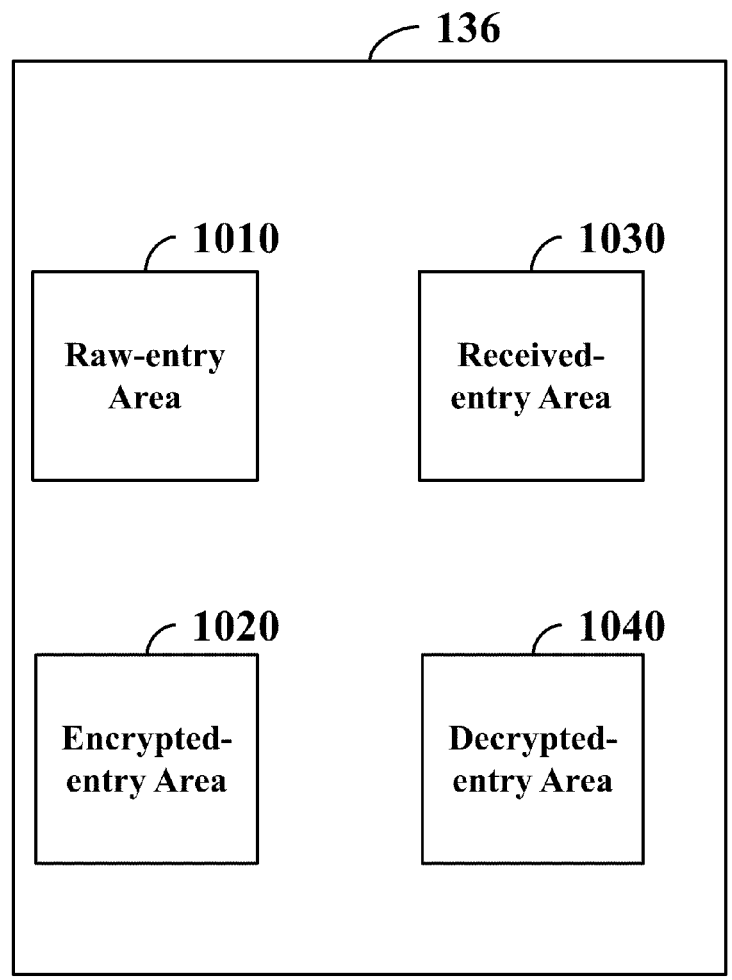
FIG. 10 is a schematic diagram for allocating memory space according to an embodiment of the invention.

Step S940: The raw HPB entries is stored in the RAM 136. Refer to FIG. 10. The RAM 136 may allocate continuous memory address space for the raw-entry area 1010. The processing unit 134 may store the raw HPB entries in the raw-entry region 1010 in the order of LBA.

Step S950: The HPB entries are encrypted and the encrypted HPB entries are stored in the RAM 136. Refer to FIG. 10. The RAM 136 may allocate continuous memory address space for the encrypted-entry area 1020. With the architecture as shown in FIG. 1, the processing unit 134 may set a register of the Codec 138 to drive the Codec 138 to read the aforementioned content of the HPB entries from the raw-entry area 1010 of the RAM 136, encrypt the HPB entries according to set parameters, and store the encrypted HPB entries in the encrypted-entry area 1020 of the RAM 136. After completing the encryption on the HPB entries, the Codec 138 issues an interrupt to the processing unit 134 to notify the completion of the encryption, so that the processing unit 134 could continue to process the encrypted HPB entries. Or, with the architecture as shown in FIG. 2, the processing unit 134 may load and execute program code of an encryption module to complete the aforementioned operations.

The exemplary feasible encryption algorithms are listed below: In some embodiments, the processing unit 134 or the Codec 138 left or right circular shifts the content of an HPB entry by n bits, where n is an arbitrary integer ranging from 1 to 63. In alternative embodiments, the processing unit 134 or the Codec 138 adds a preset key value to the content of an HPB entry. In still another embodiment, the processing unit 134 or the Codec 138 XORs the content of an HPB entry with a preset key value. In still another embodiment, the processing unit 134 or the Codec 138 randomizes the content of an HPB entry in a preset rule. For example, the preset rule states that the $i^{th}$ bit of the HPB entry is swapped with the $(63-i)^{th}$ bit of the HPB entry, for i=0 to 31.

To improve the data security, the HPB entries may be grouped into several groups according to their LBAs, and different encryption algorithms with relevant encryption parameters are applied to the groups of HPB entries, respectively. Exemplary grouping rules for the HPB entries are as follows: In some embodiments, the LBA associated with one HPB entry may be divided by a value first, and the HPB entry is grouped according to the quotient. Suppose the value is set to "100": The first group includes the HPB entries of LBA #0-99, the second group includes the HPB entries of LBA #100~199, and so on. In alternative embodiments, the LBA associated with one HPB entry may be divided by a value first, and the HPB entry is grouped according to the remainder. Suppose the value is set to "100": The first group includes the HPB entries such as LBA #0, LBA #100, LBA #200, etc., the second group includes the HPB entries such as LBA #1, LBA #101, LBA #201, etc., and so on.

In some embodiments, different groups of HPB entries may be applied by the same encryption algorithm with different encryption parameters, respectively. For example, each HPB entry content of the first group is left circular shifted by 1 bit, each HPB content of the second group is right circular shifted by 2 bits, each HPB entry content of the third group is left circular shifted by 3 bits, and so on. Or, each HPB entry content of the first group is added to or XORed with a first value, each HPB content of the second group is added to or XORed with a second value, each HPB entry content of the third group is added to or XORed with a third value, and so on. Or, each HPB entry content of the first group is randomized in a first rule, each HPB content of the second group is randomized in a second rule, each HPB entry content of the third group is randomized in a third rule, and so on.

In alternative embodiments, different groups of HPB entries may be applied by different encryption algorithms with relevant encryption parameters, respectively. For example, each HPB entry content of the first group is left circular shifted by n bits, each HPB content of the second group is XORed with a preset key value, each HPB entry content of the third group is added to a preset key value, each HPB entry content of the fourth group is randomized in a preset rule, and so on.

In some embodiments, the processing unit 134 may store a group-and-encryption mapping table in the RAM 136, which includes multiple configuration records. Each configuration record stores information indicating that a particular group of HPB entries are encrypted by a specific encryption algorithm with a specific encryption parameter. In alternative embodiments, similar information with the group-and-encryption mapping table may be embedded in the program logic executed by the processing unit 134, and the invention should not be limited thereto.

Step S960: The encrypted HPB entries are read from the encrypted-entry area 1020 of the RAM 136, and a DATA IN UPIU is delivered to the host side 110, which includes the encrypted HPB entries. Since the content of HPB entries is encrypted, illegal persons cannot comprehend the content of HPB entries through the host side 110 and know the internal management of data storage on the device side accordingly, so that sensitive data is prevented from being obtained by illegal persons in abnormal ways. Although the HPB entries are encrypted, as long as the host side 110 carries the encrypted HPB entries in the HPB READ command, the desired user data can still be obtained from the deice side.

Figure 11:
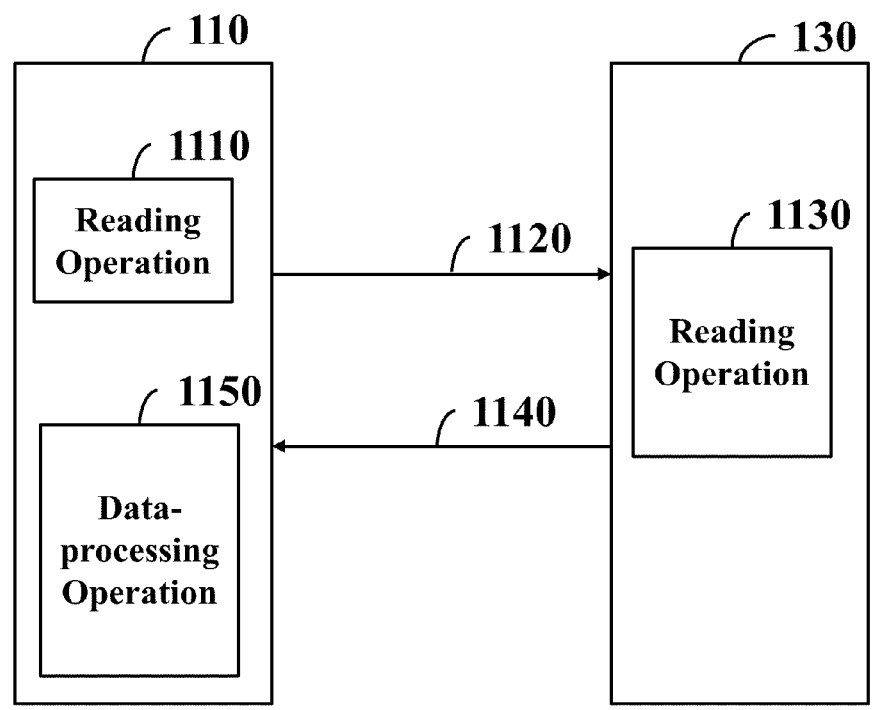
FIG. 11 is a schematic diagram showing an operation sequence for HPB data reads according to an embodiment of the invention.

Refer to FIG. 11 showing the diagram of the operation sequence for HPB data reads. The detailed description is as follows:

Operation 1110: The host side 110 obtains the HPB entries associated with user data of LBAs that is attempted to be read from the HPB cache 600. It is to be noted that the content of HPB entries is encrypted.

Operation 1120: The host side 110 issues HPB READ commands to the flash controller 130 to request the flash controller 130 for the user data of designated LBAs, and each HPB READ command includes such as an LBA, a TRANSFER LENGTH, the corresponding HPB entry, etc.

Operation 1130: The flash controller 130 decrypts the content of HPB entries, and reads the requested user data from the flash device 150 according to the PBA information of the T1 table (if required, plus the continuous length or the continuous bit table) of the decrypted HPB entries.

Operation 1140: The flash controller 130 delivers a DATA IN UPIU to the host side 110, which includes the requested user data.

Operation 1150: The host side 110 processes the user data according to the requirements of such as the Operating System (OS), the driver, the application, etc.

Figure 12:
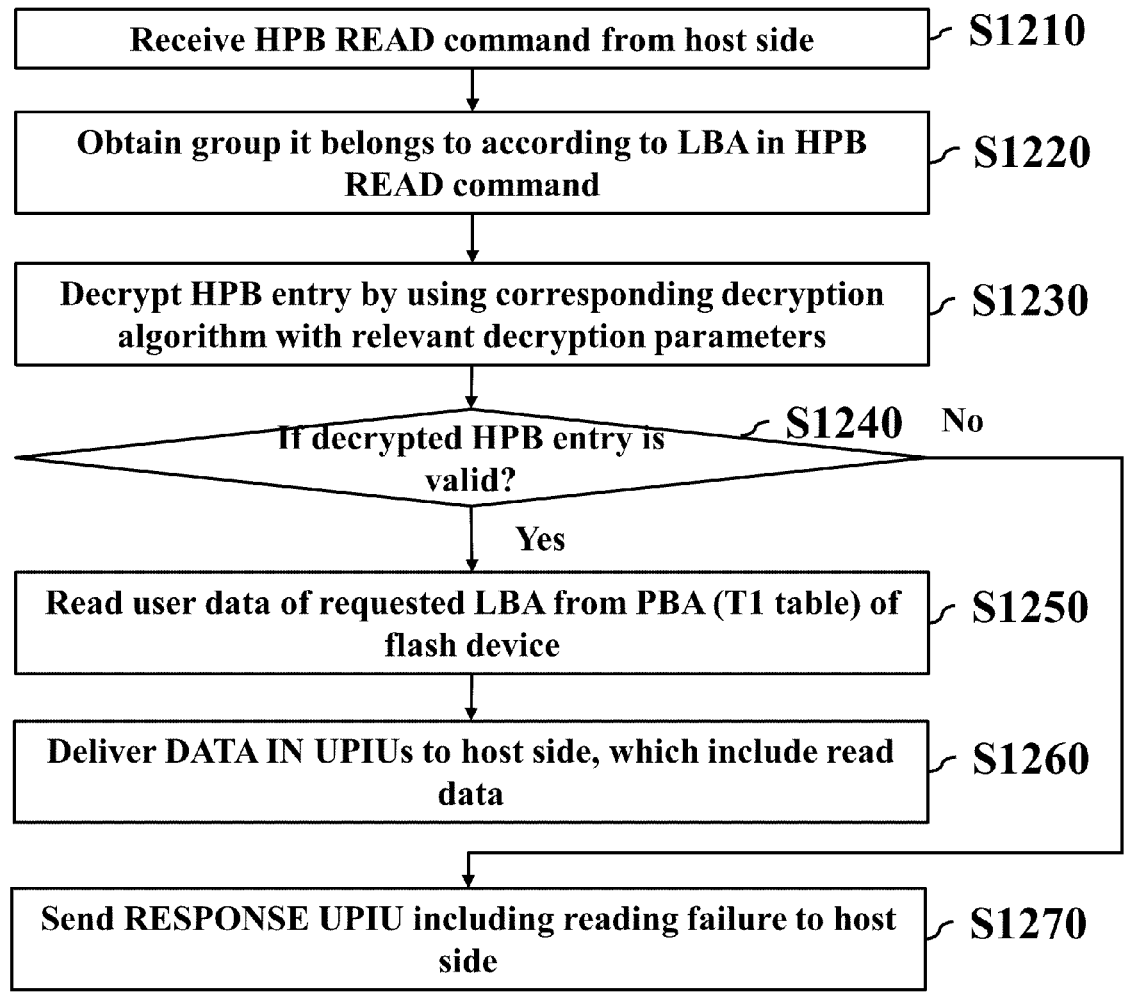
FIG. 12 is a flowchart illustrating a method for reading data according to an embodiment of the invention.

Technical details regarding the read operation 1130 may refer to FIG. 12 showing a flowchart of a method for reading user data. The method is performed by the processing unit 134 when loading and executing relevant software or firmware program code. Further description is as follows:

Step S1210: An HPB READ command including information regarding such as an LBA, a TRANSFER LENGTH, an HPB entry, etc. is received from the host side 110 through the host side 110. Refer to FIG. 10. The RAM 136 may allocate continuous memory address space for the received-entry area 1030 for storing the received HPB entries.

Step S1220: If the raw HPB entries has been undergone the aforementioned encryption in groups, then the group it belongs to is obtained according to the LBA in the HPB READ command. Technical details for obtaining the group to which the LBA belongs may be refer to the description of step S950, and are not be repeated herein for brevity. If the raw HPB entries were not undergone the aforementioned encryption in groups, this step is omitted.

Step S1230: The HPB entry is decrypted by using the corresponding decryption algorithm with relevant decryption parameters. The decryption algorithm with relevant decryption parameters is the reverse process of the encryption algorithm with relevant encryption parameters that the raw HPB entries are applied. For example, if the encryption algorithm left circular shifts the raw HPB entry content of by 2 bits, then the decryption algorithm right circular shifts the encrypted HPB entry content by 2 bits. If the encryption algorithm adds a preset value to the raw HPB entry content, then the decryption algorithm subtracts the preset value from the encrypted HPB entry content. If the encryption algorithm XORs the raw HPB entry content with a preset value, then the decryption algorithm XORs the encrypted HPB entry content with the preset value again. If the encryption algorithm randomizes the HPB entry content in a preset rule, then the decryption algorithm de-randomizes the encrypted HPB entry content in the preset rule. In some embodiments, if the raw HPB entries has been undergone the aforementioned encryption in groups, then the processing unit 134 searches the group-and-encryption mapping table in the RAM 136 to obtain the encryption algorithm with relevant encryption parameters that the LBA belongs to, and decrypts the HPB entry content by using the corresponding decryption algorithm with relevant decryption parameters.

Refer to FIG. 10. The RAM 136 may allocate continuous memory address space for the decrypted-entry area 1040. With the architecture as shown in FIG. 1, the processing unit 134 may set a register of the Codec 138 to drive the Codec 138 to read the aforementioned content of the HPB entries from the received-entry area 1030 of the RAM 136, decrypt the HPB entries according to set parameters, and store the decrypted HPB entries in the decrypted-entry area 1040 of the RAM 136. After completing the decryption on the HPB entries, the Codec 138 issues an interrupt to the processing unit 134 to notify the completion of the decryption, so that the processing unit 134 could continue to process according to the decrypted HPB entries. Or, with the architecture as shown in FIG. 2, the processing unit 134 may load and execute program code of a decryption module to complete the aforementioned operations.

Step S1240: It is determined whether the decrypted HPB entry is valid. If so, then the process proceeds to step S1250. Otherwise, the process proceeds to step S1270. If the raw HPB entry does not include information of the T2 table, then this step is ignored. The processing unit 134 may determine whether the PBA information of the T2 table included in the decrypted HPB entry matches the address that the corresponding T1 table is actually stored in the flash device 150. If they match, it means that this decrypted HPB entry is valid.

Step S1250: The user data of requested LBA is read from the PBA of the flash device 150 through the control logic 139 according to the PBA information of the T1 table in the decrypted HPB entry.

Step S1260: One or more DATA IN UPIUs are delivered to the host side 110 through the host I/F 131, which include the read user data.

Step S1270: A RESPONSE UPIU including a reading failure is sent to the host side 110 through the host I/F 131. In alternative embodiments, the RESPONSE UPIU includes a suggestion for updating the HPB entries of the corresponding Sub-Regions to the host side 110, so that the host side 110 could start the aforementioned operations 755 and 757.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 to 3, it should be noted that additional elements may be included to achieve better performance without departing from the spirit of the invention. Each element of FIGS. 1 to 3 is composed of various circuits and arranged operably to perform the aforementioned operations. While the process flows described in FIGS. 9 and 12 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for encrypting and decrypting physical-address information, performed by a flash controller, comprising:
   receiving a first read command requesting of the flash controller for a plurality of first physical block addresses (PBAs) corresponding to a logical block address (LBA) range from a host side, wherein each first PBA indicates which physical address that first user data of a first LBA of the LBA range is physically stored in a flash device;
   reading the first PBAs corresponding to the first LBAs of the LBA range from the flash device;
   arranging the first PBAs into a plurality of entries;
   grouping the entries into a plurality of groups according to the first LBAs;
   encrypting groups of entries by using the same encryption algorithm with a plurality of encryption parameters, respectively, or a plurality of encryption algorithms individually with a corresponding encryption parameter, respectively;
   delivering the encrypted entries to the host side;
   receiving a second read command requesting of the flash controller for second user data from the host side;
   obtaining information indicating which group that a second LBA carried in the second read command belongs to;
   decrypting an encrypted entry carried in the second read command by using a decryption algorithm with a decryption parameter for a belonged group to obtain a decrypted entry, wherein the decryption algorithm with the decryption parameter is a reverse process of an encryption algorithm with an encryption parameter for the belonged group;
   obtaining a second PBA from the decrypted entry;
   reading the second user data from the second PBA in the flash device; and
   delivering the second user data to the host side.

2. The method of claim 1, wherein any encryption algorithm and any decryption algorithm are performed by a coder-decoder (Codec).

3. The method of claim 1, comprising: obtaining a PBA of the T1 table from the decrypted entry; determining whether the decrypted entry is valid according to the PBA of the T1 table; and reading the user data from the second PBA in the flash device through the control logic and delivering the user data to the host side when the decrypted entry is valid.

4. The method of claim 3, comprising: sending a reading failure to the host side when the decrypted entry is invalid.

5. The method of claim 3, comprising: sending a suggestion for updating the first PBAs of the LBA range in a cache to the host side when the decrypted entry is invalid.

6. The method of claim 1, comprising: storing information indicating that each group of entries are encrypted by a specific encryption algorithm with a specific encryption parameter.

7. A non-transitory computer program product readable medium for encrypting and decrypting physical-address information when executed by a processing unit of a flash controller, the non-transitory computer program product readable medium comprising program code to:
   receive a first read command requesting of the flash controller for a plurality of first physical block addresses (PBAs) corresponding to a logical block address (LBA) range from a host side, wherein each first PBA indicates which physical address that first user data of a first LBA of the LBA range is physically stored in a flash device;
   read the first PBAs corresponding to the first LBAs of the LBA range from the flash device;
   arrange the first PBAs into a plurality of entries;
   group the entries into a plurality of groups according to the first LBAs;
   encrypt groups of entries by using the same encryption algorithm with a plurality of encryption parameters, respectively, or a plurality of encryption algorithms individually with a corresponding encryption parameter, respectively;
   deliver the encrypted entries to the host side;
   receive a second read command requesting of the flash controller for second user data from the host side;
   obtain information indicating which group that a second LBA carried in the second read command belongs to;
   decrypt an encrypted entry carried in the second read command by using a decryption algorithm with a decryption parameter for a belonged group to obtain a decrypted entry, wherein the decryption algorithm with the decryption parameter is a reverse process of an encryption algorithm with an encryption parameter for the belonged group;
   obtain a second PBA from the decrypted entry;
   read the second user data from the second PBA in the flash device; and
   deliver the second user data to the host side.

8. The non-transitory computer program product readable medium of claim 7, comprising program code to:
   obtain a PBA of the T1 table from the decrypted entry;
   determine whether the decrypted entry is valid according to the PBA of the T1 table; and
   read the user data from the second PBA in the flash device through the control logic and delivering the user data to the host side when the decrypted entry is valid.

9. The non-transitory computer program product readable medium of claim 8, comprising program code to:
   send a reading failure to the host side when the decrypted entry is invalid.

10. The non-transitory computer program product readable medium of claim 8, comprising program code to:

send a suggestion for updating the first PBAs of the LBA range in a cache to the host side when the decrypted entry is invalid.

11. The non-transitory computer program product readable medium of claim 7, wherein any encryption algorithm and the any decryption algorithm are performed by a coder-decoder (Codec).

12. The non-transitory computer program product readable medium of claim 7, comprising program code to:
store information indicating that each group of entries are encrypted by a specific encryption algorithm with a specific encryption parameter.

13. An apparatus for encrypting and decrypting physical-address information, comprising:
a control logic, coupled to a flash device;
a host interface (I/F), coupled to a host side; and
a processing unit, coupled to the control logic and the host I/F, arranged operably to receive a first read command requesting of the apparatus for a plurality of first physical block addresses (PBAs) corresponding to a logical block address (LBA) range from the host side through the host I/F, wherein each first PBA indicates which physical address that first user data of a first LBA of the LBA range is physically stored in a flash device;
read a T1 table from the flash device through the control logic, which comprises the first PBAs corresponding to the LBA range; arrange the first PBAs into a plurality of entries;
group the entries into a plurality of groups according to the first LBAs; encrypt groups of entries by using the same encryption algorithm with a plurality of encryption parameters, respectively, or a plurality of encryption algorithms individually with a corresponding encryption parameter, respectively; deliver the encrypted entries to the host side through the host I/F; receive a second read command requesting of the flash controller for second user data from the host side through the host I/F; obtain information indicating which group that a second LBA carried in the second read command belongs to; decrypt an encrypted entry carried in the second read command by using a decryption algorithm with a decryption parameter for a belonged group to obtain a decrypted entry, wherein the decryption algorithm with the decryption parameter is a reverse process of an encryption algorithm with an encryption parameter for the belonged group; obtain a second PBA from the decrypted entry; read the second user data from the second PBA in the flash device through the control logic; and deliver the second user data to the host side through the host I/F.

14. The apparatus of claim 13, comprising a coder-decoder (Codec), wherein the processing unit is arranged operably to direct the Codec to perform any encryption algorithm and any decryption algorithm.

15. The apparatus of claim 13, wherein the processing unit is arranged operably to store information indicating that each group of entries are encrypted by a specific encryption algorithm with a specific encryption parameter.

16. The apparatus of claim 13, wherein the processing unit is arranged operably to obtain a PBA of the T1 table from the decrypted entry; determine whether the decrypted entry is valid according to the PBA of the T1 table; when the decrypted entry is valid, read the second user data from the second PBA in the flash device through the control logic and deliver the user data to the host side through the host I/F.

17. The apparatus of claim 16, wherein the processing unit is arranged operably to send a reading failure to the host side through the host I/F when the decrypted entry is invalid.

18. The apparatus of claim 16, wherein the processing unit is arranged operably to send a suggestion for updating the first PBAs of the LBA range in a cache to the host side through the host I/F when the decrypted entry is invalid.

* * * * *